(12) United States Patent
Sneh

(10) Patent No.: US 7,272,782 B2
(45) Date of Patent: Sep. 18, 2007

(54) SYSTEM AND METHOD FOR PROVIDING OFFLINE WEB APPLICATION, PAGE, AND FORM ACCESS IN A NETWORKED ENVIRONMENT

(75) Inventor: Iftah Sneh, Givatiim (IL)

(73) Assignee: Backweb Technologies, Inc., San Jose, CA (US)

(*) Notice: Subject to any disclaimer, the term of this patent is extended or adjusted under 35 U.S.C. 154(b) by 0 days.

(21) Appl. No.: 11/016,444

(22) Filed: Dec. 17, 2004

(65) Prior Publication Data

US 2005/0188051 A1 Aug. 25, 2005

Related U.S. Application Data

(60) Provisional application No. 60/531,063, filed on Dec. 19, 2003.

(51) Int. Cl.
*G06F 17/24* (2006.01)

(52) U.S. Cl. .................................. 715/501.1; 709/203

(58) Field of Classification Search ................ 709/203; 715/501.1
See application file for complete search history.

(56) References Cited

U.S. PATENT DOCUMENTS

| | | | |
|---|---|---|---|
| 6,081,900 A * | 6/2000 | Subramaniam et al. ...... 715/513 |
| 2002/0083145 A1 * | 6/2002 | Perinpanathan .............. 709/213 |
| 2003/0158947 A1 * | 8/2003 | Bloch et al. ................. 709/227 |
| 2004/0003031 A1 * | 1/2004 | Brown et al. ................ 709/203 |

* cited by examiner

*Primary Examiner*—Doug Hutton
(74) *Attorney, Agent, or Firm*—Fliesler Meyer LLP

(57) ABSTRACT

A system and a method for providing offline web application, page, and form access in a networked or Internet environment. In accordance with one embodiment an Offline Access Server offline Web infrastructure based on a scalable, polite communication technology. The Offline Access Server uses an offline enabling technology, and an HTML extension such as OTML (Offline Tagging Markup Language), to enable any set of web application, application data, page, or form to operate and to be usable offline.

18 Claims, 6 Drawing Sheets

Offline Access Server Process

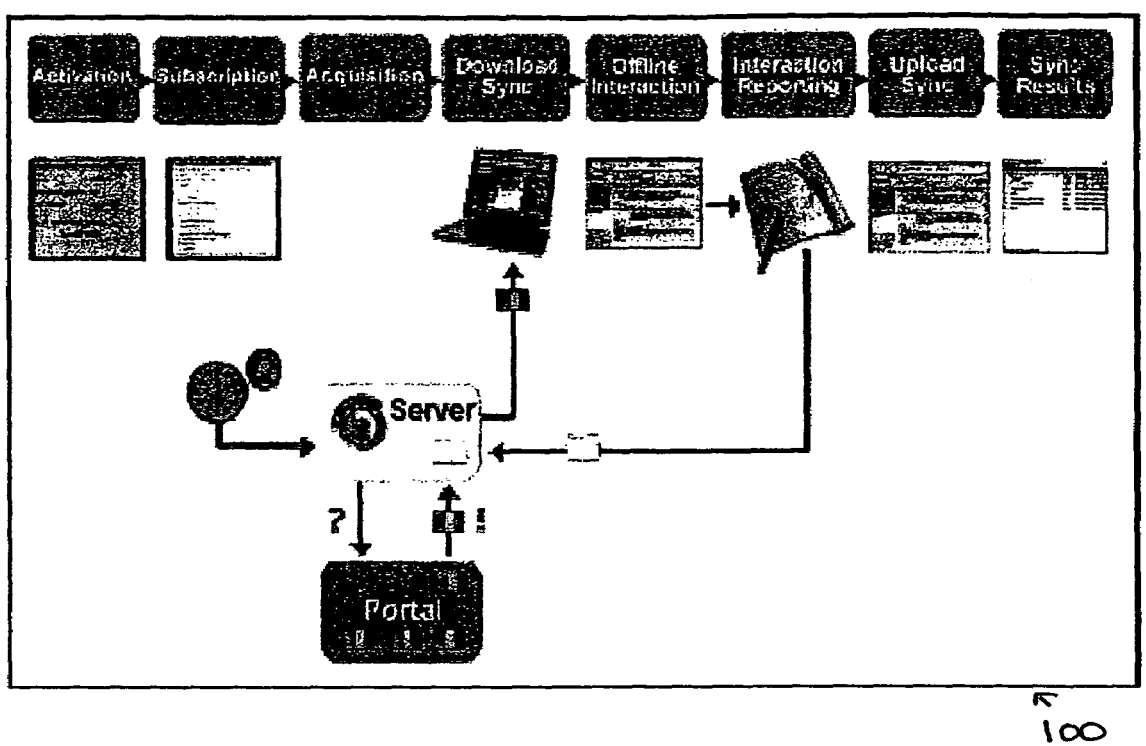
Figure 1 - The Offline Access Server in Use

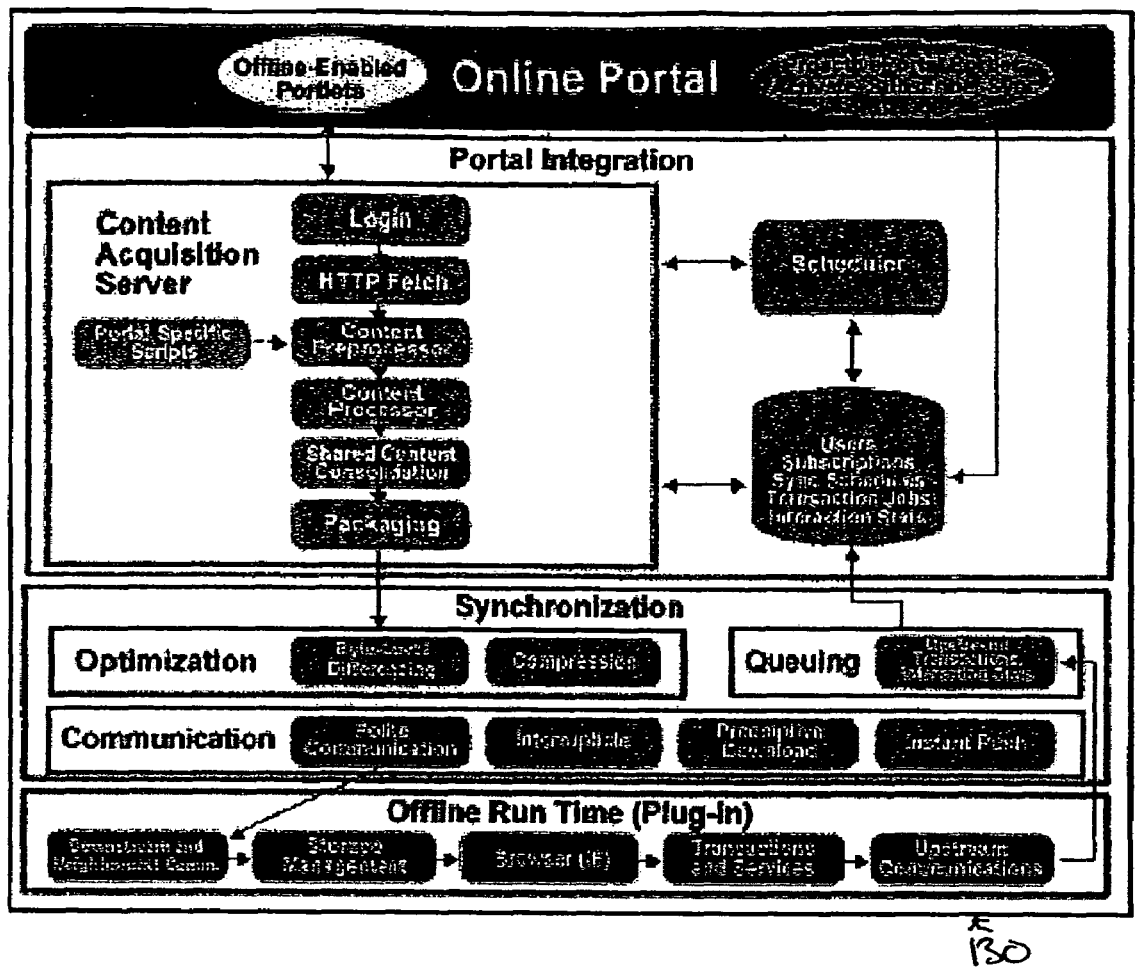
Figure 2 - The Offline Access Server Architecture

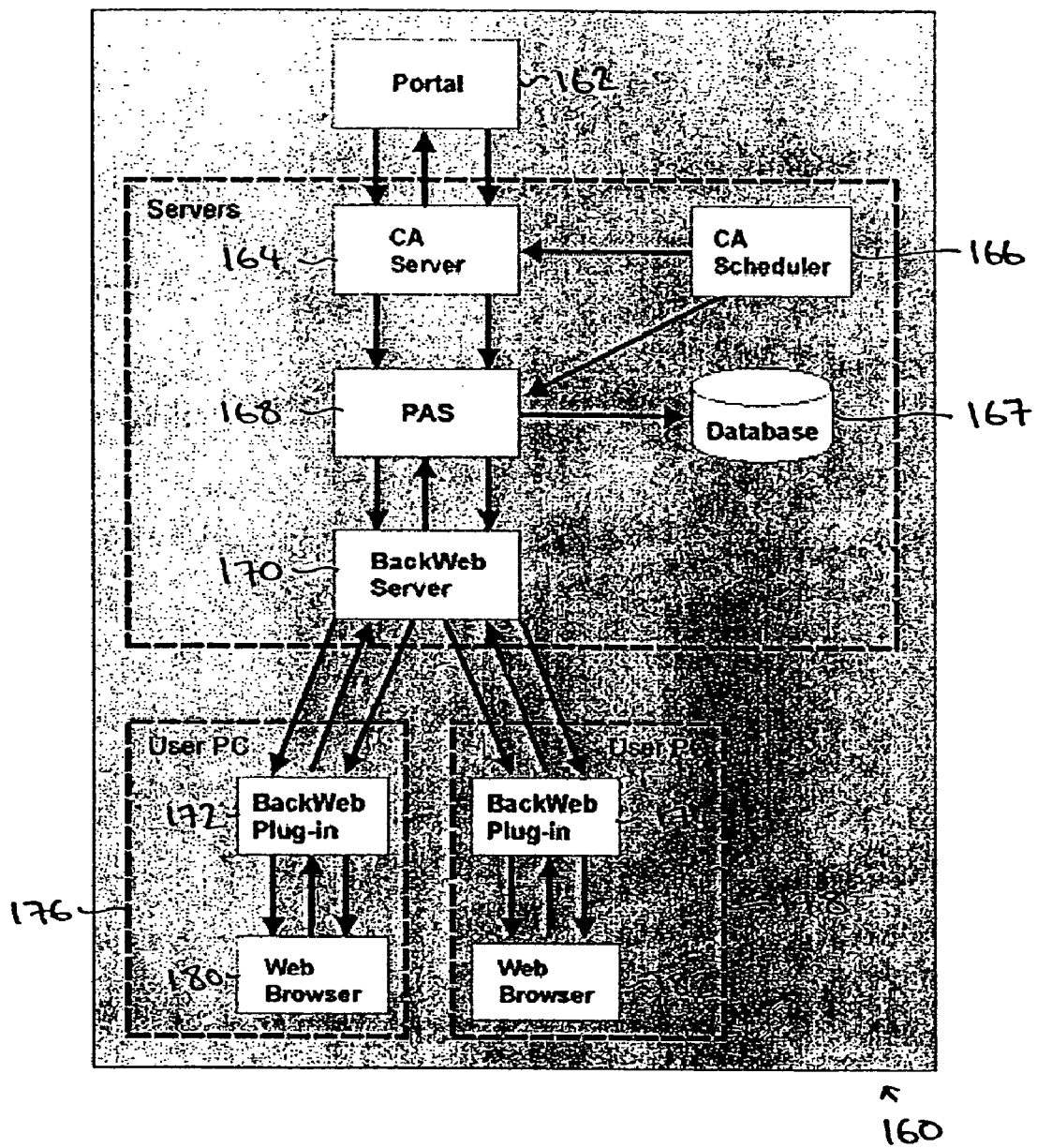
Figure 3 - The Offline Access Server Production Configuration

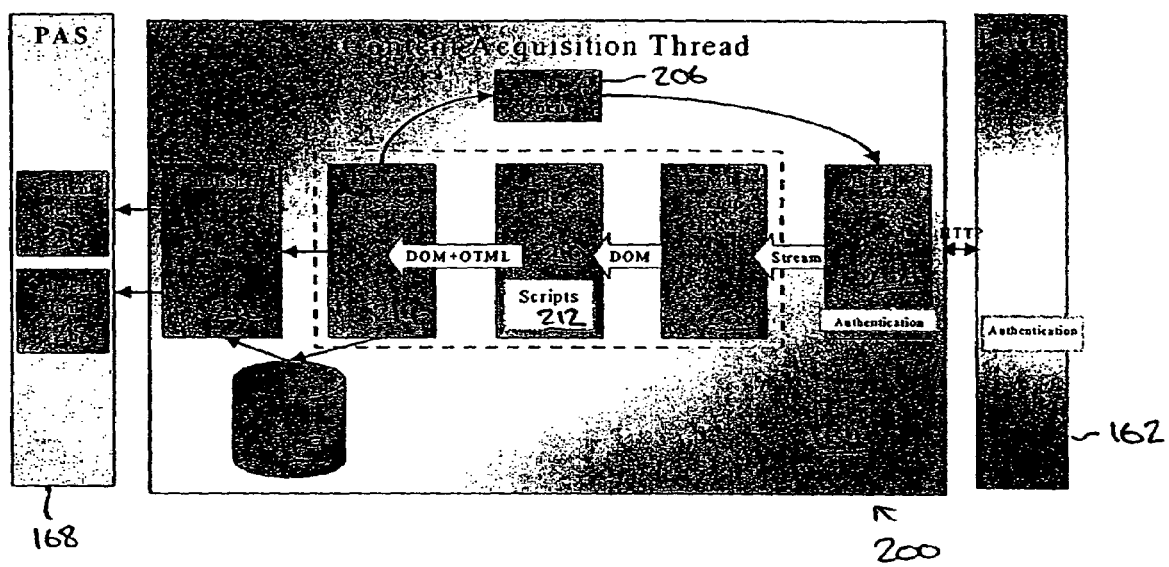
Figure 4 - Offline Access Server Process

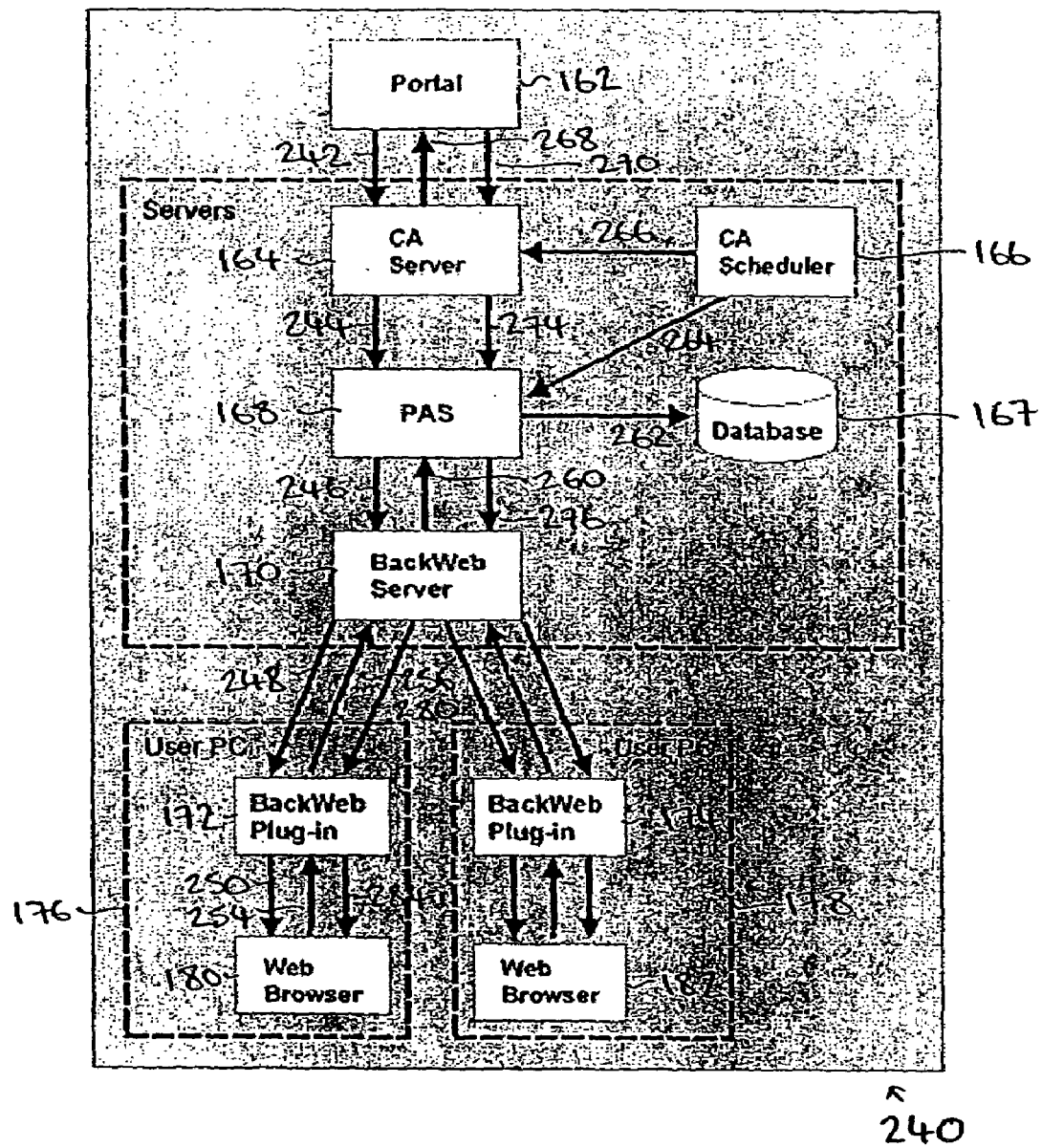
Figure 5 - Offline Access Server Forms Production Configuration

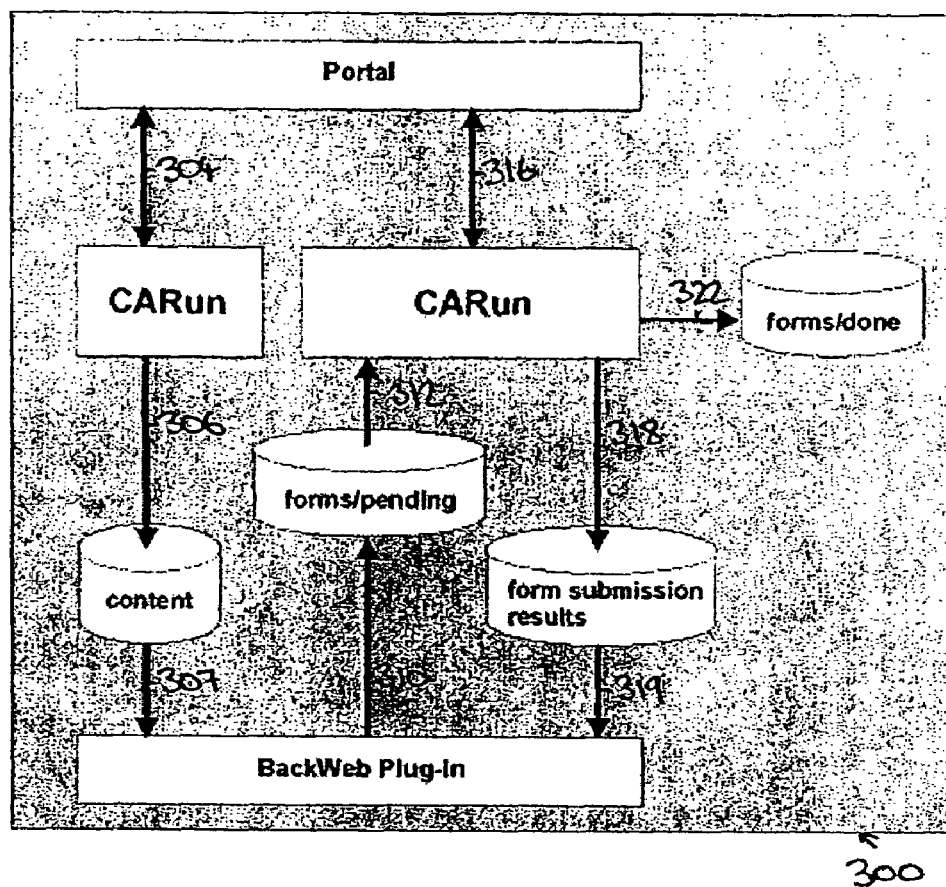
Figure 6 - CARun Content Process Flow to Plug-in

SYSTEM AND METHOD FOR PROVIDING OFFLINE WEB APPLICATION, PAGE, AND FORM ACCESS IN A NETWORKED ENVIRONMENT

CLAIM OF PRIORITY

This application claim the benefit of U.S. Provisional Application, Ser. No. 60/531,063, entitled "SYSTEM AND METHOD FOR PROVIDING OFFLINE WEB APPLICATION, PAGE, AND FORM ACCESS IN A NETWORKED ENVIRONMENT", filed Dec. 19, 2003, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to network communications and data access, and particularly to a system and method for providing offline web application, page, and form access in a networked or Internet environment.

BACKGROUND OF THE INVENTION

In the field of networked communications and data access, a corporation's enterprise software applications are becoming increasingly web-enabled, i.e. the applications are regularly designed (or redesigned) so that they can be accessed and used over a wide area network such as the Internet (the World Wide Web, or simply "Web"). Corporate Webs, Intranets, Extranets and other web-based applications are the dominant platforms that enable today's business user. However, when applied to mobile users (i.e. those users who use a laptop or other mobile computing device), and disconnected users (i.e. those users who may only connect to the network periodically), little progress has been made in the way of supporting web-enabled applications, since for these users the connection to the Web is often intermittent. Yet, within a corporation, these very users may also be some of the company's most important users—including sales and service employees, executives, and line of business managers. These users are necessarily mobile and disconnected from the office and the network. Traditional Web-based online applications are not available to mobile and disconnected users when they are on the road and with customers. Since the Web is now an important part of an business-critical enterprise application platform, there is a pressing need to extend its reach to the mobile community.

SUMMARY OF THE INVENTION

In accordance with the present invention, a system and method is described for providing offline web application, page, and form access in a networked environment. In accordance with one embodiment the invention includes an Offline Access Server (OAS) offline Web infrastructure based on a scalable, "Polite" communication technology. In accordance with one embodiment, OAS uses an offline enabling technology, and an HTML extension called OTML (Offline Tagging Markup Language), to enable Web applications to operate offline. In other embodiments, other languages or markup languages could be used with the OAS. By avoiding the need to re-engineer every existing software application to work offline, (which would require deploying a completely new code base and support infrastructure), the present invention allows a corporation to deliver an offline Web experience, including Web-based forms, in a matter of days and weeks. OAS is capable of acquiring web content on behalf of tens of thousands of users, synchronize it to their laptops with minimal impact on the network, and provide a seamless, high quality offline Web interactions, from viewing business-critical information through two-way interaction with transactional applications. OAS offers a complete solution for adapting the online web environment to the way people work, supporting the mobile professional community, and better addressing the overall needs of the organization.

BRIEF DESCRIPTION OF THE FIGURES

FIG. 1 shows an illustration of an offline application process in accordance with an embodiment of the invention.

FIG. 2 shows an illustration of a system architecture for providing offline web application, page, and form access, in accordance with an embodiment of the invention.

FIG. 3 shows an illustration of a system for providing offline web application, page, and form access in a networked environment, in accordance with an embodiment of the invention.

FIG. 4 shows a flowchart of a process used by the offline access server, in accordance with an embodiment of the invention.

FIG. 5 shows an illustration of a system including an offline access server, in accordance with an embodiment of the invention, as it is configured and used to process offline forms.

FIG. 6 shows an illustration of the cycle of offline forms in CARun, in accordance with an embodiment of the invention.

DETAILED DESCRIPTION

In accordance with the present invention, a system and method is described for providing offline web application, page, and form access in a networked environment. In accordance with one embodiment the invention includes an Offline Access Server (OAS) offline Web infrastructure based on a scalable, "Polite" communication technology. In accordance with one embodiment, OAS uses an offline enabling technology, and an HTML extension called OTML (Offline Tagging Markup Language), to enable Web applications to operate offline. In other embodiments, other languages or markup languages could be used with the OAS. By avoiding the need to re-engineer every existing software application to work offline, (which would require deploying a completely new code base and support infrastructure), the present invention allows a corporation to deliver an offline Web experience, including Web-based forms, in a matter of days and weeks. OAS is capable of acquiring web content on behalf of tens of thousands of users, synchronize it to their laptops with minimal impact on the network, and provide a seamless, high quality offline Web interactions, from viewing business-critical information through two-way interaction with transactional applications. OAS offers a complete solution for adapting the online web environment to the way people work, supporting the mobile professional community, and better addressing the overall needs of the organization.

In accordance with an embodiment of the present invention, a system and method is provided that allows for online Web-based data such as may be provided by a Web portal, including for example Web-based applications and Web-based forms, to be delivered to the user in a seamless fashion, such that the user may operate the application, complete the form, etc. and then synchronize it with the online Web portal so that any changes can be automatically uploaded to the portal. This is particularly useful in the context of Web-based forms. In accordance with one embodiment, the users operates a client machine and/or client software. Typically the client includes a browser-type application, for example Netscape Navigator or Internet Explorer. While the user is connected to the network (including the Internet, or Web), and operates a Web portal application or Web form, online data/content, including forms, is received at the client. A plugin at the client recognizes the data as being offline-enabled. In accordance with one embodiment the application or form is offline-enabled through the use of a special markup language Offline Tagging Markup Language (OTML). From the users perspective the offline version of the form substantially mimics the online version, such that it operates correctly, and seems fully functional. During use, an offline form manager at the client stores an offline application or form data locally, at the client machine. When, at a late point in time, the user reconnects to the network or the Internet, the client recognizes the connection and submits the stored data upstream. For example, stored form data is submitted to the online form, as if the user was entering the form data online at that point in time. To be able to successfully submit the application, application data, or form/form in this manner, the system emulates a users browser, so that the submission process emulates that of an actual user. From the Web portals perspective there is no substantial difference between the user operating the application or entering the form data online or offline.

In accordance with one embodiment, Java pre-processors are used to submit the actual form data to the Web portal. Other embodiments also allow the plugin at the users machine (the client) to display the status of any submitted forms.

In accordance with one embodiment, the synchronization between the client and the Web portal is performed by the OAS, which acts as an intermediary. Initially the OAS provides the application, content, or form, to the user at the users client machine. The users actions with the application or form are stored offline at the client, for later sending upstream back to the portal. When the user reconnects, the OAS receives the upstream information, and submits it to the portal. Since the back-end application at the portal is expecting to receive information from a browser, the OAS emulates a browser when submitting the upstream information to the portal. This allows the system to provide the user with offline access to a set of data, and then subsequently submit the data online, without requiring a re-write of the web or server application itself. In accordance with one embodiment, the system includes a scheduler which can trigger updates that have been made to the web or server application to be sent to the client. When the client connects to the system, this can also be used to automatically trigger synchronization.

In accordance with one embodiment, the online data (for example the actual html) is offline-enabled by including special OTML codes that instruct the client how to handle the Web portal data or form. In other embodiments, this form of OTML embedding may be replaced or supplemented with OTML pre-processors which add the necessary OTML codes prior to sending e.g. the html, application, application data, or form, or forms to the client. The OTML codes instruct the OAS and the client how the e.g. forms should operate offline. This information is then communicated to the client in the form of an infopak. The plugin at the client interprets the InfoPak to create the offline environment for the user.

In accordance with one embodiment, content may be personalized for each user. Information about such personalization can be stored in a database at the OAS.

The effect of the above features is to create an offline environment for the user that substantially emulates the online environment, such that the user may operate properly, while at the back-end the Web portal application receives input in a manner that is consistent and requires no redesign of the application itself. Since the OAS emulates the user browser, the portal application is able to accept the offline, and subsequently upstreamed, data in the usual manner. This is particularly useful in creating offline forms, since not only can the forms be offlined to the users machine, and edited there by the user, but the forms can then be synchronized upstream to the portal. This bidirectional synchronization allows for a transparent online/offline environment, both from the perspective of the user, and that of the portal itself.

Offline Synchronization

As more information becomes available through the Web, end users have to keep pace with new and changed content. Content managers are often left in the dark as to what information is most valuable to their disconnected end users ("what presentation is most often used with a customer?"). A common question is how can you squeeze the ocean of information that is available on the Web to a user's laptop? What technology is required to track, acquire and deliver a consistent user experience when disconnected from the network? There are several key requirements for such a solution:

Low offline enablement cost: an offline Web solution should avoid application re-engineering for offline use. It should aim at a single source approach where the offline enablement extends the existing online applications instead of forcing a re-build. "Single Source" strategy, where the offline enablement is part of the online application itself, dramatically reduces the complexity of maintaining an offline-enabled web application.

Robust Synchronization Infrastructure: The information accessible to the end user via the Web is substantial, including applications, processes, and content. Moving gigabytes of data on the corporate network, on a daily basis, could put this mission critical asset at risk. The ideal technology should minimize the resulting networking traffic and optimize the end user experience.

Seamless user experience offline and online: The offline Web must retain the information, personalization, and look-and-feel of the user experience. This will ensure user adoption, as well as the preservation of the investment in the web applications.

Offline Content Activation & Subscription

FIG. 1 shows an illustration of an offline application process 100 in accordance with an embodiment of the invention. In accordance with one embodiment the end user activates a plugin at their client-side machine, application, or browser (referred to herein as the "BackWeb Plug-in"), by accessing a URL in the web application. With corporate portals, a My Offline Portal Portlet (MyPP) can be made available on the portal. The BackWeb Plug-in is deployed like any other browser plug-in, and installs itself on the end user's machine. MyPP will then show the timestamp of the last offline Web update. MyPP enables the end user to do the following:

Initiate synchronization on demand: the user can initiate a synchronization to ensure the offline Web is up-to-date. However, a predefined synchronization schedule will ensure the offline Web is updated at least on a daily basis, even if the user does not initiate a synchronization.

Manage Subscriptions: MyPP lists all web applications (apps) and web content sections that are enabled for offline access in the system. Some are mandatory (based on administrator settings, and cannot be changed), and some are optional which the user can subscribe or unsubscribe from based on their particular requirements.

Access a Notification Inbox: which can be used to track the various alerts delivered to the end user.

Access a Forms Outbox: which can be used to track previous submissions of forms while offline.

Acquisition

In accordance with one embodiment, the OAS initiates a content acquisition job for an end user when it is time to schedule the daily update, or on demand. The content acquisition involves the following steps:

Logging to the Web application on behalf of the end user: This process involves the establishing of a trust relationship between the OAS and the Web system. The trust relationship is accomplished by an Authentication Plug-in that executes on OAS, leveraging APIs and Services available with most platforms and portal frameworks that allows user impersonation.

Navigating the personalized user view: The OAS brings the home page for the user and starts processing the various links on it based on user subscriptions and OTML tags that are applied to the Web application HTML. For example, if the user is subscribed to a News portlet, all the links pointing to recent news will be acquired. If the user is not subscribed to the News portlet, news links will not be available in the offline Web.

Packaging the content for delivery: At this stage the Web information is broken down to private and shared content in order to optimize storage and management overhead. Private content belongs to an individual user and must be acquired separately for every user (for example, "my stock quotes"). Shared content is shared between users and can be tracked for all of them individually (for example, a sales presentation).

Synchronization

The information packages resulting from the Acquisition stage, are handed to a Synchronization layer for optimization and delivery. The delivery optimizations are designed to minimize the size of the content and may include for example Byte-Level Differencing, File-Level Differencing and Compression. Delivery enhancements include Polite Communications, Interruptability, Preemptive Download and Instant Push. Polite communications also applies to upstream operations when forms submissions are sent to the server for execution. This can be particularly important if the user attaches large documents during its form submission (for example, when a document is uploaded into a collaboration area).

Interaction

The BackWeb Plug-in enables a seamless offline browsing experience on the PC. The user can navigate the offline Web the same way they would use the online Web. During interaction the user can:

Navigate the Web: Access information such as news, documents, presentations, etc.

Submit Forms: Submit web-based forms that are accessible via the Web. For example, the user could update meeting notes following a sales call, submit expense reports or enroll in the company 401(k). The submitted forms can then be tracked and edited using the Offline Forms Outbox.

View Alerts: The BackWeb Plug-in may alert users, via a Flash Alert, that critical information is available on the Web. The Flash Alert may point to an online or offline Web resource (such as a new price list that has been synchronized to the offline Web). The user can track the various messages delivered to them by accessing the Notification Inbox.

Forms Processing

Form Upstream: Upon reconnecting the BackWeb Plug-in upstreams the queued forms to the OAS for execution. The upstreamed forms are queued on the server and scheduled by a Content Acquisition Scheduler for execution. A Content Acquisition Server (CAS) logs in to the Web site(s) on behalf of the user, navigates to the online form and submits the offline form information as if the user had performed the action while online.

Form Results Downstream: The Content Acquisition Server captures the resulting web page and any number of associated links (depending on the OTML instructions associated with the form result). The CAS determines if the form submission was successful and sends the form result to the end user where it can be viewed in the Forms Outbox.

Offline Web Usage Tracking & Reporting

The OAS collects usage statistics on how the offline Web is being used (when is the offline Web opened, what links are accessed). The usage statistics are upstreamed when the user is connecting to the network and stored in the OAS database. Standard reporting tools can be used to produce usage reports for specific information or users. This feature provides a valuable source of information for content owners as to what information is deemed valuable for their mobile users. By extending online web usage tracking to offline interaction, OAS enables a complete picture of online and offline content usage.

Offline Access Server Architecture

FIG. 2 shows an illustration of a system architecture 130 for providing offline web application, page, and form access, in accordance with an embodiment of the invention. The Content Acquisition Server (CAS) is a high performance Web Integration engine. The CAS is responsible for extracting the web application HTML on behalf of the mobile users, identify changes and additions, and prepare the information for synchronization. The CAS has the following capabilities:

Secure Access to the Web

The CAS accesses the Web (i.e. the Web site(s)) on behalf of an end user. CAS leverages a trust relationship with the Web to securely login into the Web environment. The secured login presents CAS with the specific Web view of the mobile users, enabling personalized retrieval of the end user information.

HTML Transformation for Offline Use

An embodiment of the invention uses an Offline Tagging Markup Language (OTML). With OTML, developers integrate tags into their applications, enabling CAS to adjust the online web interface for offline use by disabling buttons and fields, supporting offline forms, producing notifications etc. A Developer Studio application is used to provide a visual development environment for using Rule-based OTML tags to offline enable web applications as well as end-to-end testing of the offline web experience. CAS extracts the HTML pages and underlying documents and forms produced by the Web application. The CAS OTML processor transforms them for offline access by processing OTML tags found in the HTML. The CAS OTML pre-processor is used to execute scripts against "vanilla HTML" in order to apply OTML tags to HTML in run time. This method is particularly useful when the application source code is not available (for example, with commercial web applications).

Working with OTML

This section describes the general concepts of OTML and presents some basic examples of OTML tags and the rationale behind them. It provides in-depth explanations of Offline Access Server shared content, offline forms, and ways to control the CA Server's processing flow, while discussing the related OTML tags. Further, it introduces advanced terms and concepts that are important for understanding OTML.

OTML stands for Offline Tagging Markup Language. OTML operates on and extends HTML. It does this in order to facilitate content acquisition from an online portal and to create an offline view of the portal. (The phrase "offline" is used to describe this offline view.) OTML tags embedded within online portal HTML pages control the transformation of those pages into pages that a browser enhanced with the BackWeb Plug-in can display offline. The CA (Content Acquisition) Server needs embedded OTML directives in order to acquire the content in an optimized way. One of OTML's important characteristics is that other HTML processing programs, browsers in particular, simply ignore it. Therefore, the developer does not need to worry about other applications accessing HTML code embedded with OTML.

There are two methods of using OTML. The recommended method, the most direct, and easiest to understand, implement, and test, is to insert OTML into the existing online portal HTML. This method is possible since OTML tags do not affect normal browser processing. You can add OTML tags directly into the online portal HTML code, or use the JSP/ASP that generates the HTML. Sometimes you cannot or do not want to change the original HTML. In such cases, in order to embed OTML in the HTML, you can write preprocessing scripts that the CA Server then runs. Of course, to write CP (content processing) scripts, the developer still must understand OTML. Either one of the methods described above might, by itself, be adequate for your needs. However, it is also possible to combine the methods. For example, you can add OTML tags directly into the online portal code and also use CP scripts in the CA Server.

The CA Server processes HTML pages containing OTML in a tree-like manner. In other words, it processes the root HTML element first. It then processes the child-elements until all elements are processed. Similarly, the CA Server processes the root page (start URL) first, and then processes child-pages. The CA Server tries to process every URL referent only once, even if there are links to it in many pages. This is true even if the URL appears in different forms. For example, as "next.html" in one place, and as "portal/next.html" in another place.

Every time the CA Server encounters a new HTML element, it decides what to do based on the element type. It leaves most HTML elements untouched. However, it treats elements such as links (<A>), areas (<AREA>), and others, in a special manner. The exact handling of such elements is dependant on OTML defaults or preferences, and on which OTML tags enclose the HTML element.

The CA Server automatically retrieves all <IMG> and <INPUT type=image> referents. It also automatically retrieves the referents of the BACKGROUND attributes for all BODY and TABLE elements. It is neither necessary nor relevant to tag these referents with GET, GET-SHARED, or anything else.

If a developer wishes to avoid the retrieval of such referents, they can do one of the following: Remove the elements referring to them from the HTML altogether beforehand. Or prevent the CA Server from processing the elements referring to them by enclosing these elements in a DON'T-PROCESS tag. The CA Server does not automatically handle IMG attributes related to image maps (USEMAP, ISMAP and LONGDESC).

Several OTML tags have an attribute whose value specifies a file. The file can be local (residing in the Customization Files directory maintained through the BackWeb Server Console). To specify a local file, the developer can use a resource: prefix. The file can also be remote. To specify remote files, they can use URLs (for example, http://myportal.mycompany.com/resourceFile.html).

If you use local files (for example, preprocessing scripts or replacement HTML files), you must insert them into the system by using a BackWeb Server Console. The content tree displayed by the console allows a developer to insert them into the processing_instructions directory along with the start.otml and defaults.otml files. The console stores these files in PAS. Whenever the CA Servers start/restart, they copy all these files from PAS to their own local directories, and the files become effective.

The following examples are just a taste of OTML. In some of the examples below, URL references like "offline-1234567:/// ... " are examples of OFFLINE protocol. Like other URL references, (for example, "http:// . . . " or "file:/// . . . "), such notation informs the browser to invoke the specific protocol handler that can locate the addressed item. For "http:// . . . " the browser uses the HTTP handler. For "offline-1234567:/// . . . " the browser uses the OFFLINE protocol handler. The OFFLINE protocol handler is automatically installed when you install the BackWeb Plug-in on a user's computer.

The GET tag encloses HTML links that point to content you want to bring offline. The CA Server brings the referent file (what the link points to) offline. Files brought offline have a unique identifier generated from their full online name. This ensures that a file like http://www.google.com/next.html does not overwrite a file like http://www.yahoo.com/next.html in the database.

```
<OTML:GET>
<A HREF="http://myportal.mycompany.com/portal/next.html">next</A>
</OTML:GET>
```

In the offline portal, the resulting HTML looks like this:

```
<A HREF=
"offline-12345678:///UI/next[abc].html?online=
http://myportal.mycompany.com/portal/next.html"
OTML-RESULT="OTML:GET">next</A>
```

In this example, the online portal URL "next.html" changes to the offline portal filename "next[abc].html". The browser uses the OFFLINE protocol handler to find the file on the user's computer. The "?online" part tells the OFFLINE protocol handler that it should load the original online URL if for some reason it cannot locate the offline file. The CA Server embeds the OTML-RESULT attribute in order to record which OTML tag enclosed the original HTML element. (In the example above, OTML-RESULT="OTML:GET".) Scripts embedded in the HTML page can use this attribute. (For further information, see the chapter, "Decorating Links".)

In general, the CA Server retrieves a particular URL referent file only once during a content acquisition session. This applies even if the CA Server encounters both absolute and relative references to the URL. It knows how to reuse the retrieved URL whenever appropriate. All links brought offline with GET are active and functional offline. For example, if a FRAME element is enclosed within the GET tag, the page that links to that frame should appear normally with the frame properly embedded in its place. If a SCRIPT element is enclosed within the GET tag, the page that links to that script should be able to activate the script offline without manual adjustments to the links. Note, however, that the script file's contents may require adjustments to function properly offline.

Theoretically, you can bring all of the online portal content offline using the GET tag. However, some parts of the online portal have no purpose offline. You can deal with these parts using the DISABLE tag.

```
<OTML:DISABLE>
Shop at <A HREF="http://www.shop.com/"><B>shop.com</B></A>
</OTML:DISABLE>
```

In the offline portal, the resulting HTML looks like this:

```
Shop at <A OTML-RESULT="OTML:DISABLE"><B>shop.com</B></A>
```

The CA Server removes the link, but retains the text. In other words, the link is gone, but the information remains. The DISABLE tag can also be used for the Edit/Minimize/Close buttons on a standard online portlet title bar. These buttons have no purpose offline since it is not possible to change the layout of the online portal pages while you are offline. Furthermore, if these buttons were enclosed with the GET tag, the CA Server would "press" them during content acquisition, possibly removing the portlet from the user's online portal.

Sometimes, simply disabling a link or section of online HTML may not be enough. The developer may want to completely remove it from the offline portal. For example, they will probably want to remove an ActiveX section that depends on online access. To do this, you must use the REMOVE tag.

```
<OTML:REMOVE>
<OBJECT CLASSID=
"3248u3432-320923rt434832-3er24">
<PARAM NAME="title">Friends Online</PARAM>
<PARAM NAME=
"server">http://www.msn.com/</PARAM>
</OBJECT>
</OTML:REMOVE>
```

In the resulting HTML for the offline portal, the HTML enclosed by the REMOVE tag does not appear. Note that the page on which this HTML originally appeared may now have some empty space or "visual gap" in it. Therefore, when using the REMOVE tag, you should verify that the resulting HTML is acceptable. If it is not, you may want to use the REPLACE tag instead. If simple removal is not enough; for example, if it results in an unacceptable "visual gap" in the offline portal, you may want to use the REPLACE tag.

```
<OTML:REPLACE SRC="stub.html">
...original html...
</OTML:REPLACE>
```

The CA Server replaces the original HTML with the contents of the stub.html file. The stub.html file may contain, for example, an explanation of why you removed the section.

You can use the ONLINE tag to keep links online.

```
<OTML:ONLINE>
...Shop at <A HREF="http://www.shop.com/">
<B>shop.com</B></A>
</OTML:ONLINE>
```

In the offline portal, the resulting HTML looks like this:

```
...Shop at <A HREF=
"offline-12345678:///app/ProactivePortalGoOnline.html?online=
http://www.shop.com/" OTML-RESULT="OTML:ONLINE">
<B>shop.com</B></A>
```

The CA Server converts the link into a special link that uses the OFFLINE protocol. When the user clicks on this link, the OFFLINE protocol handler checks if the user is currently online (connected). If so, the browser goes directly to the given URL. If not, a message asks if the user wants to go online to obtain the requested page.

In the online portal, users view personalized content, often in a display that is personalized with the user's name, chosen color schema, etc. Users also view shared content, which is identical for all users. The offline portal is made up of content items that Offline Access Server packages and downloads to the users' computers. Each content item may include multiple files, such as HTML files, script files, images, and documents (Word or PowerPoint). There are two types of Offline Access Server content items, personal and shared, reflecting the two types of online content. Each user has a single personal content item where their offline browsing begins. The personal content item contains all the information needed by the offline portal to personalize the user's browsing in the same way that the online portal does. In addition, the user may also receive shared content items in which there is content that is also available to other users. In these cases, there are links from the personal content item to the shared content items.

If the shared content item has already downloaded to the BackWeb Plug-in, activating the link simply launches the relevant file.

If the item has not yet downloaded to the BackWeb Plug-in, activating the link launches a page telling the user that this item is not yet available offline, and suggesting that the user view it online. For further information about this and other messages, see the chapter "The OFFLINE Protocol".

The system updates a user's copy of a shared content item only when there is a new version of the item in the Offline Access Server database. This is unlike the user's personal content item, which the system processes and downloads, every time there is content acquisition for the user, regardless of changes.

Tagging Shared Content

Use the GET-SHARED tag to enclose HTML links to content that you want brought offline as shared content.

```
<OTML:GET-SHARED>
<A     HREF="http://myportal.mycompany.com/portal/phonelist.doc">phone
list</A>
</OTML:GET-SHARED>
```

During content acquisition, only the first user who references a shared content item actually brings it from the online portal and publishes it to PAS for offline portal delivery. The CA Server simply adds subsequent users to a list of users who reference that particular item. In other words, subsequent users who reference the shared content item use the copy that is already available in PAS. In summary, the CA Server brings the shared content from the online portal only once and publishes it to PAS only once. PAS delivers the shared content to all users who reference it. Thus, the CA Server reduces the processing load both on the online portal, (since every shared content item is received just once), and on PAS, (since the item is published and stored just once). This applies even if the references to the shared content differ in representation (that is, absolute as opposed to relative URL references). You are responsible to indicate to the CA Server which online content is "shared". You can use the GET-SHARED tag to identify shared online content. Inherently, you should use a GET-SHARED tag to enclose links that point to *.pdf or *.doc files. You can use this tag for links that point to *.html files, too. The main issue here is not the file type (HTML or Word), but that many users reference this "shared" online content. Sometimes a link that you define as shared content (using GET-SHARED) does not result in the same content for all users. For example, an HTML page may mention the users name or link to pages that are not shared by all users. When the CA Server is instructed to get shared content, it first verifies that the content is indeed identical for all users. If the content is not identical for all users, the CA Server creates multiple instances of the content, (or "views"), to reflect the different variants. Shared content items download to the BackWeb Plug-in separately from personal content items. Only after the entire personal content item for a user has downloaded to the user's computer, does the system offer any shared content items for download. In the offline portal, activating a link brought offline as shared content (that is, clicking on the click-able text or image), generally elicits one of the following reactions:

In the offline portal, the resulting HTML looks like this:

```
<A HREF="offline-12345678:///docs/1234/phonelist[abc].doc?online=
http://myportal.mycompany.com/portal/phonelist.doc"
OTML-RESULT="OTML:GET-SHARED"
OTML-DOCLABEL="1234">phone list</A>
```

The displayed text is the same: "phone list". When the user clicks on the link in the offline portal, the browser uses the OFFLINE protocol handler to load and display the document. The expansion "docs/1234" tells the OFFLINE protocol handler that it should look for a shared content item with the ID, "1234". The ID is a string identifier assigned to the shared content item during content acquisition. Note that, just as for the GET tag, files brought offline have a unique identifier generated from their online name. In the above example, "phonelist.doc" becomes "phonelist[abc].doc". This ensures that the offline copy of http://company/phonelist.doc does not overwrite the offline copy of http://personal/phonelist.doc.

When a GET-SHARED tag encloses a link to an HTML page, the shared content typically includes more than one page. In addition to the first HTML page, the shared content may include other pages that can be reached via a link from that page, images embedded in the pages, and so on. All these HTML pages should include instructions for offline transformation. (In other words, they should include OTML tags, inserted either at the source, or by CP scripts applied to the pages.) Links to other pages or images included in a shared content item should be enclosed in a GET tag, (not in another GET-SHARED tag). Using a GET tag in the context of a shared content item results in these pages becoming part of the shared content item. When adding OTML tags to shared content pages, you should be aware that the tags apply in the context of shared content. You should not include links from the shared content to any user-specific page in the portal. You should either disable these links using the DISABLE tag as explained above, or use the REFER tag. The REFER tag lets you refer to another file without including the file in the shared content. The tag fixes the link so that it prompts the OFFLINE protocol handler to look for the referred file in the user's offline personal content item, and if not found, to go online. It is also possible to refer to another shared content item from within a shared content item, using the REFER-SHARED tag.

Two-way Integration

CAS uses its web integration capabilities not only to acquire information from the Web but also to apply changes to the Web, initiated by the user when accessing the offline Web.

Content Staging Optimization

CAS optimizes content staging storage by classifying content as "Personalized" or "Shared". Personalized content includes pages that have user-specific information such as the user's sales opportunities or service requests. Shared content is common to many users. Usually these are documents such as presentation, product collateral, price lists, etc.

Content Acquisition Scheduler

The Content Acquisition Scheduler is responsible for initiating content acquisition and transaction execution jobs. Content acquisition jobs are typically initiated daily or when a user requests ad-hoc synchronization. Transaction execution jobs are initiated when the BackWeb Plug-In upstream transactions that were submitted while offline for execution. The scheduler is responsible for allocating jobs to the various CAS servers as they complete.

Synchronization Layer: Polite Sync Server

A synchronization layer (referred to herein as the "BackWeb Polite Sync Server") ensures automatic downloading of information in the background, stopping when other network applications are in use. As a result, users never experience fluctuations in their systems' performance, even when receiving large amounts of information. Polite communications is implemented throughout the BackWeb architecture and can be tuned to meet traffic priorities over the particular LAN or WAN. Polite communications is implemented in several areas:

Idle-Time Network Communication—Content is downloaded only when the network is idle and other IP-based network traffic (e.g., email, web browsing, etc.) is not occurring. When a user is connected to the network, most of that connection time is typically not used for sending and receiving content. It is instead used for reading (e.g., e-mail or web pages), writing (e.g., composing an e-mail message), or other activities that don't utilize bandwidth.

Polite communications without affecting network performance—If the user's PC is too busy to receive content from the BackWeb Offline Access Server, a semi-aggressive mode is available to give BackWeb a priority equal to other applications.

Interruptible Communication—Polite communications is incremental and can tolerate interruptions by other applications or even network disconnections. The plug-in maintains the state of the download and will resume where it left off the next time a network connection is established. Consequently, users can receive very large files (e.g., 20 MB or more) without dedicating any time to the download. This approach saves time and money and creates a positive user experience.

Compression—Content is automatically packaged and cached in an industry-standard ZIP format. All content types are compressed, including HTML pages, documents, etc. The overhead for each file is minimized since the entire InfoPak is downloaded as a single compressed file.

Byte-Level Differential Updates—Every piece of content that is stored on the server and then updated generates a byte-level difference file and sends only the bytes that have changed. The original file can then be reconstructed by the plug-in. For example, if a 20 MB sales presentation is re-published to the Web where one slide is added and one slide is removed, the byte-level different file will include the new slide and the position of the old slide only—a difference of perhaps 100 KB. This approach dramatically reduces the amount of information sent by the network, especially when the same file must be sent to many users.

File-Level Differential Updates—Polite communications ensures that any file is downloaded only once to a plug-in until it is updated on the server. When the file is updated on the server, it is delivered via byte-level differencing. When the file is removed, it is also removed from the plug-in, thus avoiding the accumulation of unused files on users' PCs. For example, Web pages include numerous resources such as graphic images, shared scripts and style sheets. Although these resources are referenced by many pages and for many users, each resource file will be downloaded only once to each user and will be removed when the resource is no longer needed by the targeted user.

LAN-Based Peer-to-Peer Polite Communications (referred to herein as "Polite Neighborcast")—Polite Neighborcast allows content to be delivered in a peer-to-peer fashion between plug-ins residing on the same LAN. When a document crosses the Wide Area Network (WAN) and arrives at any plug-in in a remote office, the document can now be served to other plug-ins on its subnet via HTTP. Once other plug-ins receive the file, they can then serve the file to additional plug-ins requesting the file. The number of plug-ins able to serve others eventually expands, allowing the document to be delivered very rapidly without overwhelming the network or any single plug-in.

Critical Content Delivery Services

Preemptive Download: Many times it is critical to deliver information ASAP. For example, a BackWeb Plug-in may be downloading a 10 MB presentation when a virus alert is detected on the Web and is targeted to all users of the system. The presentation download might take many hours to complete, while the virus alert can be delivered in seconds. BackWeb OAS will preempt the download for the presentation, deliver the virus alert and then resume download of the suspended presentation.

Instant Push: BackWeb architecture scalability is partly derived from a polling-based approach to plug-in/server communication. That is, the BackWeb Plug-in may check with the servers from time to time if new information is available. However, if critical information such as virus alert is available for delivery, it is required for all plug-ins to receive the information ASAP. Using Instant Push, the server can instruct all plug-ins targeted for the virus alert to poll the server immediately in order to receive the information before their scheduled poll.

Preemptive Download and Instant Push are combined to ensure that critical information is delivered ASAP, regardless of the plug-in state (if it is downloading, the download will be preempted, if it is idle, it will be notified of availability of information requiring immediate download.)

Communication Security

To prevent unauthorized access to sensitive data during transmission, the OAS communications can support RSA 40-bit/128-bit RC-4 symmetrical encryption algorithms. Also, the BackWeb Polite Sync Server can digitally sign content to enable Server authentication and data integrity using X.509 VeriSign, Thawte and Microsoft certificates. When content is signed, users can verify its origin before executing. Content that is not signed can be denied access to the BackWeb Plug-in.

BackWeb Plug-in

The BackWeb Plug-in is the core communication, storage and user experience management component on the PC. The plug-in works with the Polite Sync Server to deliver Web content and integrate it into the local offline replica. The plug-in performs local storage management to ensure data is not "piling" on the PC. All information that is no longer accessible to the end user while online, is removed from the offline replica. This could occur if the information expired, or the user lost access right to it in the online Web. As the user navigates the offline Web, the plug-in responds to request to present web information. If a document is not yet available (because it was not delivered yet), the user will be presented with a clear message and asked to go online to retrieve the document (no messy "Page not Found" 404 error messages). The plug-in can encrypt all content stored on the PC using Windows Encrypted File System (EFS). Only if the user that owns the data is logged into the machine can the data be accessed. This mechanism that is built into all Windows XP/2000 operating systems, protects the offline information store in the case the laptop is stolen or lost. In addition, BackWeb can optionally use an ID and Password to protect launching the Offline Portal in addition to the security provided by the Windows Desktop Login.

For offline-enabled forms, the plug-in receives the forms submissions and queue them for execution. When the user reconnects, the plug-in upstreams the forms for execution and later receives the results which can be viewed via the Offline Forms Outbox.

The plug-in is capable of displaying high impact visual messages to announce availability of new or updated content. The messages can carry with them Web content for viewing when offline, or direct the user to an online resource for more information. The user can view the history of messages she received by accessing the Offline Notification Inbox.

The plug-in records interaction events of the user with various content items, notifications and forms in the system. This information is upstreamed and stored in OAS, to be later analyzed to determine what information is most commonly used or not used by remote users.

Use of the OAS in a Portal Environment

FIG. 3 shows an illustration of a system for providing offline web application, page, and form access in a networked environment, in accordance with an embodiment of the invention. In accordance with one embodiment, the system comprises the following components:

1. Portal 162.
2. Portal integration system, comprising the Content Acquisition Server 164 and Content Acquisition Scheduler 166 components. The Content Acquisition Server component is responsible for retrieving portal content from the portal, processing it for offline use, and publishing it to the Communication Server. Content may be published through CORBA. The system can include one or more Content Acquisition Servers, depending on the required scale. The Content Acquisition Scheduler component is responsible for invoking content acquisition on behalf of the users. It accesses the user names and acquisition schedule from the system database, and requests the Content Acquisition Server to run sessions accordingly. The requests to the Content Acquisition Server can also be done through CORBA. It will be evident that here, as throughout this description, that each of the servers, and server components, may be components operating on separate physical machines or computers, or on the same physical machine.

3. Communication Server, comprising a PAS 168 (Proactive Administration Server) and a BackWeb Server 170. These components are responsible for communicating the ProactivePortal (PPS) content to the users' Plug-ins, and for receiving upstream content from the Plug-ins. The communication with the Plug-in takes place in the BackWeb Polite protocol, or over HTTP.

4. BackWeb Plug-in 172, 174. This component is installed on the end-users' machines 176, 178. It communicates with the users browser 180, 182 (for example, Netscape Navigator or Microsoft Internet Explorer) to enable the user to browse in the offline content stored in the Plug-in's internal data store.

5. BackWeb Server Console. This component (not represented in the diagram) is the administrator console for monitoring, configuring, and managing the entire ProactivePortal Server.

Content Acquisition Server (CAS) Architecture

FIG. 4 shows a flowchart of a process 200 used by the offline access server, in accordance with an embodiment of the invention. The Content Acquisition Server consists of the following modules:

1. HTTP services 204, responsible for the communication with the portal.
2. URL queue 206, responsible for managing the order of the session. A Content Acquisition session works on portal URLs one by one; URLs waiting to be brought from the portal are queued in the URL queue.
3. HTML to DOM/Text to DOM 208, responsible for transforming the text of the portal data into a DOM structure.
4. Pre-processor 210, responsible for running the scripts 212 that process the DOM, making changes in the DOM that are necessary to offline-enable it, such as embedding OTML.
5. OTML processor 214, responsible for processing the OTML-embedded DOM, transforming it for offline, and queuing URLs in the URL queue.
6. Publisher 216, responsible for publishing the results 218 of the Content Acquisition session to the PAS.

Page Acquisition

PPS gets the first page of the portal, searches within it for further links, and decides what to do with every one of the further links.

Retrieving the Page through HTTP

The page is retrieved from the portal using the HTTP protocol.

HTML Parsing

In order to be able to search the page for further links, PPS needs to parse the page. Furthermore, it needs to parse the page into a DOM, for reasons explained below. This introduces a challenge, since HTML is not well formed XML; rather, it is a more "loose" format: its de-facto specification is the one implemented by the commercial browsers, which are more lenient than the formal specification. This looseness of HTML poses a requirement on the systems that want to parse it. PPS has a special component called "HTML to DOM"; this component implements rules and various heuristics that allow it to transform HTML into a DOM.

OTML Directions for Offline-Enabling

Not every link in the page is treated the same way. Some links are required to be available offline; some are not required (or even relevant) offline. Some pages have sections that should be removed altogether for the offline mode. The distinction between parts of the portal that should be offline-enabled and parts that shouldn't cannot always be made independently by PPS; there needs to be a way for the application owner to instruct PPS what to do with different sections or links. For this purpose, PPS uses OTML, which operates on and extends HTML. It does this in order to facilitate content acquisition from an online portal and to create an offline view of the portal. OTML tags embedded within online portal HTML pages control the transformation of those pages into pages that a browser enhanced with the BackWeb Plug-in can display offline. The CA (Content Acquisition) Server needs embedded OTML directives in order to acquire the content in an optimized way. One of OTML's important characteristics is that other HTML processing programs, browsers in particular, simply ignore it. There is no problem with other applications accessing HTML code embedded with OTML. It's possible to add OTML tags directly into the online portal HTML code, or do so through the JSP/ASP that generates the HTML.

HTML Pre-Processing

Sometimes it may be either undesirable or unfeasible to change the original HTML to embed OTML in it. In such cases, in order to embed OTML in the HTML, preprocessing scripts can be added so that the CA Server runs them on the page. The preprocessing scripts work on the page as represented in a DOM: this allows XPATH processing and DOM manipulations, as opposed to simple text-based processing that would require the preprocessing scripts to actually parse the page. Another advantage of the pre-processing capability is the possibility to inspect and process client-side scripts in the page.

OTML Defaults

Pre-processing scripts and embedded OTML are not the only ways to instruct PPS how to offline-enable a page; it is also possible to give PPS general instructions for processing links through "OTML defaults". Through OTML defaults you can, for example, define to PPS that <A> links must be brought offline, <AREA>s should be disabled, and so forth. The developer/administrator can even define OTML defaults that are conditional on information in or near the link: for example, to instruct PPS to bring offline all <A> links, except if their HREF is in a domain which is different from your portal domain. If the pages can usually be offline-enabled according to a fixed mapping, the developer can avoid many pre-processing scripts, and can avoid embedding OTML.

Automatic Processing

Some links should always be brought offline, not requiring the application owner's discretion. Some examples are images, background sounds, scripts, and styles. PPS automatically recognizes these links and brings them offline automatically (it also parses style sheets and brings all the links referred to within).

Acquiring a Portal for an Offline User

Acquiring the entire portal for offline generally happens in the following manner:

1. The PPS "logs in" to the portal
2. The first page of the portal is retrieved and the HTML is parsed into a DOM.
3. The DOM is sent through pre-processing (if there is pre-processing defined for this page).
4. The DOM is searched for links, OTML etc.
5. Every URL that needs to be offline enabled is queued in an internal queue.
6. The DOM is saved
7. The first URL in the internal queue is extracted, and the process repeats for that URL.

A URL may appear more than once in the portal. Some pages or files are linked to from multiple pages. It is important that PPS not retrieve URLs from the portal more than once, to avoid overloading the portal, and to avoid excess processing on the PPS side. To avoid this, PPS remembers every URL that it has retrieved in the current session, and does not retrieve it again; URLs are remembered in "absolute" form (rather than relative). In some cases, comparing the required URL against a URL "history" is not enough, because URLs change in mid-session. For example, in some portals, a request ID is appended to every URL; this request ID is incremented every time a request is made (e.g. "reqid=1" vs "reqid=2"). This makes it irrelevant to simply compare URLs to the history. To work around this, PPS introduces the notion of "aliases": the developer can indicate to PPS that certain URLs, though seemingly different, are actually equivalent.

The Internet is infinite; so are some portals. If the developer does not limit content acquisition, it could theoretically bring the entire online portal offline. This is probably not what is desired. The would most likely want to limit content acquisition so that both the time it takes to do CA Server processing for each user and the amount of content acquired for each user are reasonable. The developer has a few ways to limit content acquisition:

1. Planting OTML tags that "disable" the links that should not be retrieved.
2. Specifying the "depth" to acquire. The maximum depth of content acquisition can be controlled by specifying the depth that is allowed from a specified point. In other words, by telling the CA Server how deep to go. This is done using the OTML DEPTH attribute, which sets the remaining depth. As PPS successively brings new pages, it automatically decreases the value of the DEPTH attribute by one. This continues until the DEPTH attribute value is 0, at which point the CA Server does not bring the page to which the GET refers.
3. Setting a maximum number of URLs to retrieve: this sets a hard limit on the number of URLs PPS will retrieve in a single session. If this limit is reached, PPS will not bring any more URLs offline. This measure ensures that even if the developer has a bug that would cause too-big content acquisition content acquisition will stop reasonably.

Retrieving links from the portal doesn't always succeed. PPS can tolerate errors, and by default, if it fails to bring a link, the users will simply get an offline portal update that is missing that link. Sometimes, if PPS fails to bring a link from the portal, it may be better not to update users' machines. If, for example, the most important area for offline users is the "contacts" page, and today's content acquisition failed to bring it, it might not be desirable to replace yesterday's copies of the offline portal, which include the "contacts" page, with today's copies, which do not include the "contacts" page. On the other hand, for other links on the portal, failures can be ignored. If, for example, PPS fails to bring a .gif file that is used for a button graphic on one of the pages, it may still be useful to update the copy of the offline portal, albeit with a missing button graphic.

Error Handling

A link is considered as "failed" in the following cases:

When the online portal returns an error upon PPS's request for the link, for example, the HTTP 404 error.

Sometimes, the online portal does not return an error when failing to bring a page, but instead returns an HTML page that explains the failure to the user. (This is especially common when gateways are involved). OTML provides a special tag that can be embedded in such pages, indicating to PPS that this HTML page is actually equivalent to an HTTP-level error.

When the link is to an HTML page and too many of the links in the page are "failed". For example, over fifty percent of the links in the page are failed.

PPS allows the developer to define various error-handling behaviors, besides ignoring:

1. Defining a link referent as "critical" (using an OTML attribute on the link) causes content acquisition to abort if the link fails, not updating the users' offline portals with the missing links.

2. Defining an "error threshold": the developer can define the percentage of link failures that is tolerated. If, for example, the developer defined this to be 50%, a page in which 5 out of 20 links have failed will be considered successful; that same page will be considered failed if more than 10 of its links fail.

3. Aborting a session through OTML: the developer can decide that the content acquisitions session should be aborted, not updating the user's offline portal. OTML provides a special ABORT tag for this purpose. PPS applies retries when a content acquisition session is aborted because of errors.

Controlling the Load on the Portal

PPS introduces additional load on the portal servers. There are several ways to control and reduce this load:

1. Configuring the maximum number of concurrent content acquisition sessions. This is accomplished by configuring the number of threads that are initialized. Every thread runs a single content acquisition session at a time.

2. Configuring content acquisition scheduling: PPS has a configurable schedule for content acquisition—such as "every day, between 2 and 6 AM", or "every Saturday and Sunday for 24 hours". This way the portal doesn't need to answer requests from PPS in its peak hours, or while maintenance procedures are run.

3. Configuring a "content acquisition throttle": the content acquisition throttle limits the number of HTTP requests that are issued in a specified period of time—such as "a maximum of 10 requests per second".

4. Defining shared content-items: some parts of the content on the portal are personalized, whereas other parts of the content are common to all of their users. For example, the portal may greet the user by name in the top banner, but the product price list will probably be the same for all users. In addition, some content on the portal does not change very often (the price list is a good example here as well). PPS allows shared content items to be defined. A shared content item will not be retrieved from the portal for every user in every session, but rather will be retrieved from the portal once in a while (the developer decides how often), and shared among all the users whose offline portal links to that item. With the shared items, PPS includes a privacy-assurance mechanism: some items may seem shared but actually not be; PPS makes sure that shared items prone to personalization are indeed shared.

Personalized Content

The information served to the users can be restricted and personalized: for example, different users may have different content access privileges; they can subscribe to different content, and customize their views. Each PPS user's offline portal reflects his personal view of the online portal. This is important for the offline experience to be as equal as possible to the online experience. To achieve this, PPS actually logs into the portal on behalf of each and every PPS user, and retrieves that user's content personally.

User Impersonation

Portals employ means of authentication, to validate the identity of the person trying to access portal information. When PPS logs into the portal, it needs the portal to allow access to the current user's content. It would not be acceptable, however, for PPS to store the users' portal passwords—for many reasons, only one of them being security. Therefore, PPS needs to employ other means to convince the portal to serve the content of the current user. Many commercial portals and web application servers have standard APIs that allow 3rd-party server systems to function as a trusted authentication entity, validating or rejecting user requests. PPS uses these APIs securely to log in as the different PPS users. PPS itself has an API that allows developers to write specific implementations of authentication solutions ("authentication plug-ins") that implement the PPS-side of the protocol.

Browser Emulation—HTTP Headers

The content that the portal serves to the different users sometimes differs based on the type and version of browser the user uses, and on the languages configured in the browser. A specification of the browser type and version is sent to the portal in the "User-Agent" HTTP header; the languages are sent in the "Accept-Language" HTTP header. In order for the offline portal to be similar to the online portal, PPS uses the exact same HTTP headers as the user's browser uses when making requests against the portal. The PPS client-side plugin gets the information from the browser, and propagates it to the server; each user's browser settings are thus stored in the PPS database. In addition to the browser specification HTTP headers, PPS also communicates cookies to the portal when making requests. PPS stores the persistent cookies the portal sends it in the database, to use in subsequent sessions.

Automatic Background Synchronization

PPS users do not need to be aware of synchronization: in the background, PPS syncs against the portal, and downloads the differences between the current portal image and the previous one. The administrator can configure the automatic synchronization schedule.

Offline Forms

The offline portal provided by PPS is not simply read-only. Rather, it is possible to offline-enable HTML forms, allowing users to submit them when offline. The data of form submissions submitted from the offline portal is stored in a persistent internal queue in the BackWeb plugin. The elements queued in this queue are sent to the server-side as soon as the user connects to the network. When the PPS server-side receives the form data from the plugin, it submits it against the portal. PPS retrieves the result (which can be multi-page) from the portal and sends it to the user. The user can then access the form results.

PPS Form Submission

Even the simplest, most straightforward form submission requires PPS to log into the portal before submitting it.

Merging of Up-to-Date Data

For some forms, simply logging into the portal is not enough, because up-to-date data from the portal is required for the submission to succeed. For example, the form may contain hidden fields whose data changes from time to time, and the portal application expects. Another example is that the form's action URL may have a component that changes between sessions (like a session ID), and which the portal application expects. For these forms PPS supports a form submission mode that after logging in, accesses the page in which the form was originally found, and allows preprocessing scripts to manipulate the form submission data before its submission. For some forms, it is impossible to simply jump to the page where the form was found. Rather, it is only possible to get to the form by following a "trail" of portal pages, ending in the page where the form was found. PPS supports this special mode; the developer only needs to indicate that the form submission mode should be the one that follows the trail of pages.

Form Result Processing

PPS sends the form result (the pages that the portal serves to PPS after the form submission) to the user. Form submissions don't always succeed, however: for example, data may be missing from the form, the input may be invalid or wrong, or the request in the form may be denied. In such cases, the portal serves HTML pages and PPS sends them to the user. It is important for the user to know that a form submission has failed. Best if PPS can visually indicate to the user that a form submission has failed, without requiring the user to actually check every new form result. PPS accomplishes this by allowing the developer to embed a special-purpose OTML tag in the form result, indicating to PPS whether the form has failed. This result is used to report the form status to the user.

Collision Prevention

Most portal applications were not planned with offline submission in mind. Offline submission introduces new possibilities of user input, and some portal applications do not handle these possibilities well. One example is conflicting update of a database record. Consider an application that allows employees to update common records (like customer contacts). Two employees that update the same record at the same time may cause inconsistencies in the data. When online, the chances of this happening are slim. Therefore, the application doesn't need to implement integrity checks or such means to protect the records from conflicting updates. The offline portal increases the chances of conflicting data updates, often without a possibility to change the portal application accordingly. PPS provides developers with several ways to prevent form collisions: for example, it's possible to instruct PPS to run a preprocessing script before form submission; this scripts compares the data received from the plugin to the up-to-date data in the portal, and decides whether the form submission is relevant, or is irrelevant and should be cancelled. If the form submission is cancelled, the user is informed.

Revising a Form Submission

Sometimes the user may have submitted a form, and, when still disconnected from the network, wishes to withdraw the form submission, or change the data in the form. The BackWeb Plugin allows the user to cancel and to edit form submissions that have not yet been sent to the server-side.

Viewing Content in the Browser

The user accesses the offline content in the browser, just like he does the online content. In order to enable the browser to access the BackWeb Plug-in's internal file store, and to access other ProactivePortal features (e.g. form submission results), the Plug-in introduces the OFFLINE protocol. This is a pluggable protocol, integrated with the browser. The references between the pages of the offline portal are all in the OFFLINE protocol. This means that the offline portal is self-contained, and does not mix with the online portal. The user can browse the online portal in one IE window, and browse the offline portal in another window, without their affecting each other. The user knows exactly what content is online and what offline, keeping clear the freshness of the content.

Subscription to Offline Portal Content

The user may not need (or want) all of the portal content that is offline-enabled, to actually be available in his offline portal. This may happen for various reasons, such wanting to cut down disk usage, or wanting to limit the synchronization time. For this purpose, ProactivePortal introduces offline subscriptions. The user can decide which content should be available in his offline portal, and which should not. The subscription granularity can be determined by the developer, and is usually tied to portal entities such as iViews (Portlets, Gadgets etc.).

Administrator Control Over Offline Subscriptions

The administrator has various ways to control what content the users get offline. It's possible to define content that is mandatory, offline by default but not mandatory, or offline enabled but off by default. In addition, the administrator can decide to subscribe the users himself, not to allowing them to self-administer.

"Sync Now" for Content Freshness

ProactivePortal automatically updates the offline portal periodically. The user does not need to interact with ProactivePortal to ensure the receipt of fresh content. Sometimes, however, the user would like to initiate a synchronization action, so that the content is refreshed presently, without waiting for the automatic refresh. One example of a situation where this might be called for, is before the user disconnects and takes an airplane trip, during which he needs up-to-date content offline. For this purpose, ProactivePortal has a "Sync Now" feature. The user can hit a "Sync Now" button in the portal, triggering a prioritized Content Acquisition session on his behalf. During the synchronization of the content, the portal can display progress indications (a progress percentage, a list of files being downloaded, or something else; this is customizable).

Content Awareness

Portals are usually passive creatures; the users' exposure to portal content depends largely on the users' going to the portal and browsing. Moving business-critical data to the portal is therefore not an easy decision, since users might easily miss updates. PPS introduces content awareness for this purpose: the users can be notified about new, updated, or otherwise important content that is now available in the offline portal. Custom animations run by the Plug-in's Attention Manager are used to draw the users' attention to new content. All notifications are accumulated in the ProactivePortal Notification Inbox, where the user can view and manage them.

Offline Forms

Offline Access Server enables you to bring online forms to the offline portal by using OTML tagging. A form is a section of an HTML page containing input elements such as text fields, check boxes, and list boxes that the user completes by entering information and selecting options. This section describes how offline forms work, specifically how they are processed through the entire Offline Access Server production configuration, from the online portal to the Web browser. FIG. 5 shows an illustration of a system including an offline access server, in accordance with an embodiment of the invention, as it is configured and used to process offline forms. The following steps outline the cycle of offline forms:

1. The online form is acquired from the portal and is sent to the plug-in for offline viewing.
2. The user fills in the offline version of the form.
3. The offline form is uploaded and submitted to the portal when the user connects to the network.
4. The portal response is acquired and sent to the user for offline viewing.
5. The user views the portal response.

As shown in FIG. 5, in step Step 242 the CA Server acquires an online form (from the portal) during content acquisition.

In steps 244, 246, and 248 the CA Server prepares the form for offline use, packages it with the current content item and sends it to the user's BackWeb Plug-in (via PAS and the BackWeb Server). In addition, the CA Server creates an XML file containing the form's metadata: its title and summary and other information about the form. It sends the XML file to the user's BackWeb Plug-in, too (via PAS and the BackWeb Server).

In step 250, while browsing through offline content (in the Web browser) the user may decide to fill in the form. In accordance with one embodiment the information with which the user completes the form is stored as a list of name-value pairs. This list has the same content and format as the name-value list contained in the HTTP GET or POST that would result if the form had been submitted online. The name is the form element's name. The value is the information the user entered for the form element (for textual input), or the value associated with an option (for any check box, select, and button input). For example, if the form has a "City" field, and the user entered "New York" in the field, one of the form's name-value pairs are: name="City", value="New York". The list of name-value pairs constitutes the form's data.

In step 254, when the user submits the form offline (in the Web browser), the form's data is sent to the BackWeb Plug-in.

In step 156, the BackWeb Plug-in adds metadata, which specifies how the form should be submitted. It queues the form's data and metadata, and as soon as network connection is available, it sends it upstream to the BackWeb Server. While the form is pending upload in the BackWeb Plug-in, if the form were enabled for editing by the developer, the user can select to edit the form submission. While editing, the original submission is suspended, i.e. it cannot start uploading. If the user chooses to submit the edited form, it replaces the original submission. The user may also dismiss the new submission, and resume uploading the original.

In steps 260 and 262, when the offline form submission reaches the BackWeb Server, it sends it to PAS, which in turn puts it in the database.

In steps 264 and 266, the CA Scheduler constantly checks the database for content acquisition tasks and offline form submissions for the user. It then sends a job for the user, a list of forms to submit, including the data and metadata for each form and an indication of whether to perform content acquisition to the CA Server.

In step 268, for each form in turn, the CA Server checks the metadata to determine when and how to submit the form, logs on to the portal, and submits the form to the portal according to the instructions specified in the metadata.

In step 270, after submission of a form to the portal, the portal then returns an HTML page to the CA Server. The CA Server then runs a script that processes the HTML page, possibly analyzing links and getting other pages. The first HTML page returned by the portal, together with any other pages the script may get, are the form submission result. The script may analyze the form submission result to determine if the submission failed, and generate the form submission status ("Error" or "Completed").

In steps 274, 276, and 280, the CA Server packages the form submission status and the form submission result in a content item and publishes it to PAS, which in turn sends the content item to the BackWeb Server, which in turn sends the content item to the BackWeb Plug-in. The CA Server then continues on to the next form listed in the job. When it has submitted all the forms, it performs content acquisition, if specified in the job.

In step 284, the user can then use the Offline Forms Outbox (in the Web browser) to view the form submission result.

How Offline Forms Differ from Online Forms

This section focuses on the basic differences between offline forms and online forms from the user's and developer's points of view.

The User's Point of View

With online forms, submission and processing are executed immediately. The user receives immediate feedback, whether the submission was successful or not. With offline forms, the form submission and processing are deferred until a later point in time. The user needs to check the Forms Outbox for the results of the submission. When the form is viewed offline, it appears the same as it does when viewed online. As mentioned above, the differences between online and offline forms are readily apparent once the submission process begins. After clicking the Submit button of an offline form, the user does not receive immediate feedback from the portal. Instead, the browser displays a confirmation message page stating that the form has been successfully submitted offline and what to expect next: The form is going to be uploaded and submitted online later. The portal is going to process the form data. The result is going to be downloaded to the Forms Outbox.

The Developer's Point of View

What triggers one effect when the user clicks Submit in an online form and another effect when the user clicks Submit in an offline form? The key stimulus here is the ACTION attribute of the FORM element in the underlying HTML. In the online form, the ACTION attribute specifies the URL of the portal procedure that processes the form data. In the offline form, the ACTION attribute conveys instructions to the BackWeb Plug-in how to handle the form data. To implement a form's offline capability, instruct the CA Server to change the ACTION attribute of the FORM element. Do this by enclosing the FORM element that you want to work offline with the OTML tag, OFFLINE-FORM. Following is a code sample of an online form. You can see that the ACTION attribute points to a JSP program in the portal. This program processes the form data and returns the form submission result. The form submission result is displayed immediately in the browser.

```
<FORM METHOD="POST" ACTION="process_filled_form.jsp">
...form controls go here ...
</FORM>
```

The following code sample shows how to use the OFFLINE-FORM tag to enclose the form.

```
<OTML:OFFLINE-FORM OFFLINE-ID="ExpenseReport">
<FORM METHOD="POST" ACTION="process_filled_form.jsp">
...form controls go here ...
</FORM>
</OTML:OFFLINE-FORM>
```

The final part of the example, below, shows the resulting HTML in the offline form. Here you can see that the ACTION attribute now contains a URL in the OFFLINE protocol. This ensures that the BackWeb Plug-in, and not the portal, handles the form data when the user clicks Submit. The original ACTION URL is moved to the form metadata XML file. In the following example, the enclosing OTML tags no longer appear in the code. This occurs since the OFFLINE-FORM tag is no longer necessary once the CA Server has reacted to it and has changed the ACTION attribute.

```
<FORM METHOD="POST"
ACTION="offline-3014640:///forms/UI/ID=
ExpenseReport/NAVIGATION=ref
resh">
...form controls go here ...
</FORM>
```

The ACTION attribute also echoes the value of the OFFLINE-ID attribute of the OFFLINE-FORM tag. The NAVIGATION code determines what the browser shows when the user clicks OK in the confirmation dialog box. The CA Server handles submitting the uploaded form data to the portal, according to the following steps:

1. Acquiring the Form Again (optional). It is sometimes required to get the page that contains the form again from the portal, before submitting the form data. This may be, for example, because the portal maintains a session, only allowing submitting a form within the same session in which the form was displayed. See details below.

2. Submitting the form. It sends the form data to the portal and gets the response.

3. Form Result Processing. It processes the response for offline viewing. See details below.

If any of these steps fail, the CA Server tries to handle this form submission again, after a while. The interval between retries is configurable through the BackWeb Server Console, and so is the number of retries.

Acquiring the Form Again Before Online Submission

This section explains why it is sometimes necessary to acquire the form again before the online submission, how to trigger acquisition of the page containing the form before the form data is submitted, and what you can do with the results of this acquisition.

Setting Acquisition Type

You can use the GET-BEFORE-SUBMISSION attribute of the FORM-SUBMISSION tag to determine whether the CA Server should process the online form before submitting the completed form. If the form can be directly submitted online using the data as received from the plug-in, set the GET-BEFORE-SUBMISSION-ATTRIBUTE to the value "none". However, there are occasions, which necessitate acquiring the form again, before online submission. For example, it is often required to retrieve the page that embeds the form and copy some data from this page to the form data before it is submitted to the portal. For instance, it might be desired to copy the value of the hidden fields from the online form into the submitted data (in case the hidden fields include some session data). If you need to retrieve and process the page that embeds the form, set the GET-BEFORE-SUBMISSION attribute to the value "embedding-page". If the portal does not allow direct access to the embedding page, the CA Server must follow the trail of pages that led to the form. To enable this, set the GET-BEFORE-SUBMISSION attribute to the value "pages-in-trail". When the CA Server acquires such a form, it remembers the trail of pages that led to the form, including their aliases. When the CA Server later follows the trail, it compares the URLs and aliases that it finds to the ones it expects according to the remembered trail. The CA Server only acquires a URL if it appears in the trail. The URLs in the original trail may not be identical to the URLs in the current trail, since the URLs may include the session ID or other parts that differ from session to session. In such cases, use the ALIAS attribute of GET and GET-SHARED applied to the URLs in the trail, and make sure that the value of the ALIAS attribute does not differ between sessions. If there is a page, which is not in the trail of pages, but which influences the form or a variable in the form, then the CA Server must process all pages in the portal to the depth where the form was originally found. To enable this, set the GET-BEFORE-SUBMISSION attribute to the value "all-pages".

Manipulating Form Data

The developer must manipulate form data when an online form differs from its offline counterpart. For instance, when a form includes hidden fields that specify the session ID or other session related data. Such fields may be used by the Web page to determine whether or not a session is current. If a submitted form contains hidden fields that indicate that the session is not current, the portal rejects the submission. In such cases, the CA Server must change the hidden fields in the offline form, so that they specify current session data. Form data manipulation is also necessary when fields are added or removed in the interval of time between when the form was brought offline and when it arrived at the CA Server for online submission. In such cases, the CA Server must manipulate the submitted form's data to match the changes in the online form. To handle these situations, use JavaScript Preprocessing services to manipulate the form data. These allows adding, removing, and changing values in the submitted form, as well as modifying the form metadata, such as the ACTION URL and the METHOD to be used.

Canceling a Form Submission

It is possible to cancel the submission of the current form. When you do so, the CA Server does not attempt to re-submit the form, instead it sends an appropriate error response to the plug-in. For example, you may want to cancel a form submission if the script examines the form data and determines that the current data undergoing submission might collide with a previous update to the same data.

Collision Detection

It is important to implement collision detection when working with offline forms, if there are multiple users performing transactions concurrently on the same data, and the portal does not protect the data from collisions. If, when offline, a user modifies records in a certain form and then submits that form, he may end up overriding changes someone else made within the time period between form acquisition and submission. Therefore, it is important to build a collision detection mechanism, which compares the form data with the data in the current portal to determine whether or not to cancel the form submission. For instance, suppose you have a form to update a record in some database, and suppose this form includes some hidden field that denotes the revision of the record. Before the form is submitted to the portal, the CA Server gets the page embedding the form again; then, the script can compare the value of the revision field in the form data submitted by the user to the value of this field in the form just retrieved from the portal. If the revision is not the same, the script can conclude that the record has been updated, since the form was initially acquired for offline; therefore, rendering it unwise to submit the form as is. When this occurs, the script cancels the submission and sends a response to the user that explains the problem and allows them to fill the updated form (the form with the latest revision) and resubmit the data.

Form Result Processing

Form result processing is the consequence of what the CA Server does with the portal's response to the submission. The response is an HTML page, possibly with links to other pages in the portal. The CA Server does the following with the portal's response:

It processes it so the links work properly offline, similarly as it does with any other page it acquires from the portal for offline presentation.

It wraps it in a content item and publishes it to PAS.

The PRE-PROCESSING-CODE attribute of the OTML tag FORM-RESULT-PROCESSING tells the CA Server what script to use when processing the result. If, for example, the result page always contains a short message confirming the submission (or announcing a rejection because of some problem in the values), then it is enough to bring this page offline almost "as is", making sure that any links in it are either disabled or fixed to properly work offline. Assuming the script "simple.js" can do the necessary link manipulation, wrap the HTML form with the following OTML:

```
<OTML:OFFLINE-FORM>
<OTML:FORM-RESULT-PROCESSING PRE-PROCESSING-CODE=
"simple.js" />
... the HTML form goes here
</OTML:OFFLINE-FORM>
```

Sometimes the result page is more complex, and then "simple.js" is not sufficient. The result page may even contain another form in it. Further, content acquisition of the result requires designing and script development just as acquiring the first page of the portal (and the pages it links to) does. The similarity between form submission acquisition and general content acquisition is reflected in the syntax of GET and FORM-RESULT-PROCESSING. When the form result content item gets to the user, it is presented in the outbox with the status "Completed" or "Failed". This depends on the value of the attribute RESULT of the OTML tag FORM-SUBMISSION-RESULT. The FORM-SUBMISSION-RESULT tag may be embedded in the result page or placed there by the form result processing script (as specified in FORM-RESULT-PROCESSING, as previously discussed). If the tag is neither embedded nor placed by the script, then the status is "Completed".

Setting Submission Dependency

Forms are submitted in the order they have been filled by the user. However, if a form submission fails, the next form is processed. It is sometimes desirable to submit a form only if some other form has succeeded. To achieve this, use dependency groups. A dependency group is a group of forms within which the submission of each form is dependent on the finalization of the preceding forms in the group. You can use the SUBMISSION-ORDER-GROUP attribute of the FORM-SUBMISSION tag to define a dependency group. A form is finalized when either it has been submitted successfully, or all submission retries have been exhausted.

Limitations of Offline Forms

Online forms, constructed as wizards, where each successive step is dependent on previous steps of submission to the online portal, cannot be brought offline. (It is not possible to enter all the necessary information in such forms offline.)

Offline Forms in CARun

FIG. 6 shows an illustration of the cycle of offline forms in CARun, in accordance with an embodiment of the invention.

In step 304, CARun acquires content from the Portal (including offline enabled forms).

In steps 306 and 307, CARun publishes content to the plug-in, and the plug-in reads and displays the content. CARun publishes all the content it acquires to the BackWeb Plug-in. It also puts a copy of the content in the project's "output" sub-folder. This includes a single personal content item and optionally some shared content items. If the content contains forms, the CARun publishes the XML representation of the forms' metadata as well.

In step 310, when the user fills a form and submits it, the plug-in saves the form's data and metadata as a single file in the forms/pending sub-folder under the project directory. The directory contains one file perform submission. This file has the same structure as the message uploaded from the BackWeb Plug-in to the server in a production environment.

In step 312, in the next time it is run CARun reads the form submission file from the forms/pending sub-folder. After it finishes handling this form submission (steps 316-322 below), it reads the next file, until all files are processed.

In step 316, CARun submits the form to the portal.

In step 318, 319, CARun publishes the results of the submitted form to the plug-in. The plug-in reads the results and displays them in the Forms Outbox.

In step 322, CARun places the submitted forms in the forms/done sub-directory under the project directory. Each form submitted successfully is moved to forms/done. If you want to re-submit the form, you can move the form file from forms/done and move it to forms/pending without re-submitting it from the plug-in, and re-run CARun.

Debugging Offline Forms without CARun

When developing offline forms, it is sometimes helpful to see intermediate information of the form submission process. When using the CA Server, you can configure the plug-in to create a copy of the submission file, so that you can examine the form data and metadata. The file has the same format as the one created for CARun in the forms/pending sub-folder of the CARun project. You first need to change the log level of the BackWeb Plug-in to 3 or above. To change the log level of the BackWeb Plug-in 1. In the installation data directory, edit the UsrPrefs.ini file.

2. In the [Global] section, change the value of the LogLevel attribute to DW_3.

3. Restart the BackWeb Plug-in.

This does the following: Adds extra info to the PlugProt.log and DocMap.log log files (located in the data directory); and Places a copy of the form submission message that is uploaded to the server, in the data/debug directory. This message contains the form data supplied by the user, and extra meta information about the form submission.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the system and methods described above are described in the context of a Web or Portal server, it will be evident that the system and methods may be used with other types of network servers, application servers, Internet servers, Intranets, and Extranets. Furthermore, while various embodiments of the system and methods described above are described in the context of the OTML markup language, it will be evident that other types of language, markup language, or functionality could be used with the offline access server to provide offline web application, page, and form access in a networked or Internet environment. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing offline access to application content in a networked or Internet environment, comprising the steps of:

accessing a web-based application at a web page or portal on behalf of a user;

navigating an online version of the web-based application in accordance with any configuration information defined for the user;

acquiring application content from the web-based application to create an acquired content, including reading markup tags in the web-based application that specify which portions of the web-based application are to be made available offline;

packaging the acquired content for use offline, including replacing links in the portions to be made available offline, with offline-specific links, as specified by the markup tags, to create an offline version that substantially emulates the appearance of the online version;

sending the offline version of the application content to the client for offline access;

allowing the user of the client to read and update the offline version of the application content while offline, and to then upload the updates the user has made to the application content after going back online;

receiving the updates, and converting the updates to match the online version of the web-based application; and, submitting the updates to the application content to the web-based application, including unloading the updates made to the offline-specific links with the corresponding links in the web-based application, on behalf of the user, as if the user was online.

2. The method of claim 1 further comprising the steps of acquiring a response from the web-based application or portal and sending it to the user for offline viewing by the user.

3. The method of claim 1 wherein, when a form is sent to the client, the user fills in the offline version of the application, application data, or form, which is automatically or manually submitted to the web page or portal when the user connects to the network.

4. The method of claim 1 wherein the step of navigating an online version of the web-based application in accordance with any configuration information defined for the user includes establishing a trust relationship between the system and a server hosting the web application.

5. The method of claim 1 wherein during content acquisition, content is acquired from the web-based application only once, on behalf of a first user who references the content, and subsequently the system stores the acquired content as a shared copy, and allows subsequent users to access the shared copy of the corresponding package, manipulate it offline, and upload any updates the subsequent users have made to the application content, without having to again acquire the content from the web-based application.

6. The method of claim 1 wherein the web-based application is a web page, and wherein the application content comprises hypertext markup language links to online content, and wherein during the steps of acquiring and packaging, the markup tags are parsed to modify some of the hypertext markup language links so that when the web page is accessed offline, the client interprets the modified links as pointing to files that are stored locally on the client instead of pointing to the original online content.

7. A system that provides offline access to application content in a networked or Internet environment, comprising a server, in communication with an online web page or portal, and with a client, wherein the server performs the steps of:

accessing a web-based application at a web page or portal on behalf of a user;

navigating an online version of the web-based application in accordance with any configuration information defined for the user;

acquiring application content from the web-based application to create an acquired content, including reading markup tags in the web-based application that specify which portions of the web-based application are to be made available offline;

packaging the acquired content for use offline, including replacing links in the portions to be made available offline, with offline-specific links, as specified by the markup tags, to create an offline version that substantially emulates the appearance of the online version;

sending the offline version of the application content to the client for offline access;

allowing the user of the client to read and update the offline version of the application content while offline, and to then upload the updates the user has made to the application content after going back online;

receiving the updates, and converting the updates to match the online version of the web-based application; and, submitting the updates to the application content to the web-based application, including uploading the updates made to the offline-specific links with the corresponding links in the web-based application, on behalf of the user, as if the user was online.

8. The system of claim 1 wherein the server performs the additional steps of acquiring a response from the web-based application or portal and sending it to the user for offline viewing by the user.

9. The system of claim 1 wherein, when a form is sent to the client the user fills in the offline version of the form, which is automatically or manually submitted to the web page or portal when the user connects to the network.

10. The system of claim 1 wherein the step of navigating en online version of the web-based application in accordance with any configuration information defined for the user includes establishing a trust relationship between the system and a server hosting the web application.

11. The system of claim 1 wherein during content acquisition, content is acquired from the web-based application only once, on behalf of a first user who references the content, and subsequently the system stores the acquired content as a shared copy, and allows subsequent users to access the shared copy of the corresponding package, manipulate it offline, and upload any updates the subsequent users have made to the application content, without having to again acquire the content from the web-based application.

12. The system of claim 1 wherein the web-based application is a web page, and wherein the application content comprises hypertext markup language links to online content, and wherein during the steps of acquiring and packaging, the markup tags are parsed to modify some of the hypertext markup language links so that when the web page is accessed offline, the client interprets the modified links as pointing to files that are stored locally on the client instead of pointing to the original online content.

13. A computer readable medium including instructions stored thereon which when executed by the computer cause the computer to perform the steps of:

accessing a web-based application at a web page or portal on behalf of a user;

navigating an online version of the web-based application in accordance with any configuration information defined for the user;

acquiring application content from the web-based application to create an acquired content, including reading markup tags in the web-based application that specify which portions of the web-based application are to be made available offline;

packaging the acquired content for use offline, including replacing links in the portions to be made available offline, with offline-specific links, as specified by the markup tags, to create an offline version that substantially emulates the appearance of the online version;

sending the offline version of the application content to the client for offline access;

allowing the user of the client to read and update the offline version of the application content while offline, and to then upload the updates the user has made to the application content after going back online;

receiving the updates, and converting the updates to match the online version of the web-based application; and, submitting the updates to the application content to the web-based application, including uploading the updates made to the offline-specific links with the corresponding links in the web-based application, on behalf of the user, as if the user was online.

14. The computer readable medium of claim 13 further comprising the steps of acquiring a response from the web-based application or portal and sending it to the user for offline viewing by the user.

15. The computer readable medium of claim 13 wherein, when a form is sent to the client, the user fills in the offline version of the application, application data, or form, which is automatically or manually submitted to the web page or portal when the user connects to the network.

16. The computer readable medium of claim 13 wherein the step of navigating an online version of the web-based application in accordance with any configuration information defined for the user includes establishing a trust relationship between the system and a server hosting the web application.

17. The computer readable medium of claim 13 wherein during content acquisition, content is acquired from the web-based application only once, on behalf of a first user who references the content, and subsequently the system stores the acquired content as a shared copy, and allows subsequent users to access the shared copy of the corresponding package, manipulate it offline, and upload any updates the subsequent users have made to the application content, without having to again acquire the content from the web-based application.

18. The computer readable medium of claim 13 wherein the web-based application is a web page, and wherein the application content comprises hypertext markup language links to online content, and wherein during the steps of acquiring and packaging, the markup tags are parsed to modify same of the hypertext markup language links so that when the web page is accessed offline, the client interprets the modified links as pointing to files that are stored locally on the client instead of pointing to the original online content.

* * * * *